(12) United States Patent (10) Patent No.: US 8,750,723 B2
Neilson (45) Date of Patent: Jun. 10, 2014

(54) GENERATION OF A FULL-RATE OPTICAL DUOBINARY SIGNAL USING HALF-RATE ELECTRICAL BINARY SIGNALS

(75) Inventor: David T. Neilson, Old Bridge, NJ (US)

(73) Assignee: Alcatel Lucent, Paris (FR)

( * ) Notice: Subject to any disclaimer, the term of this patent is extended or adjusted under 35 U.S.C. 154(b) by 2143 days.

(21) Appl. No.: 11/614,325

(22) Filed: Dec. 21, 2006

(65) Prior Publication Data

US 2008/0152355 A1 Jun. 26, 2008

(51) Int. Cl.
*H04B 10/54* (2013.01)
(52) U.S. Cl.
USPC .......................................................... 398/186
(58) Field of Classification Search
USPC ........................................................... 398/186
See application file for complete search history.

(56) References Cited

U.S. PATENT DOCUMENTS

| | | | |
|---|---|---|---|
| 5,867,534 A | 2/1999 | Price et al. | |
| 5,999,300 A * | 12/1999 | Davies et al. | 398/185 |
| 6,522,438 B1 * | 2/2003 | Mizuhara | 398/189 |
| 7,280,767 B1 * | 10/2007 | Ho et al. | 398/183 |
| 2007/0154137 A1 * | 7/2007 | Mino et al. | 385/16 |

OTHER PUBLICATIONS

Hoon Kim et al., "On the Use of 2.5-Gb/s Mach-Zehnder Modulators to Generate 10-Gb/s Optical Duobinary Signals," IEEE Photonics Technology Letters, 2004, vol. 16, pp. 2577-2579.

Peter J. Winzer et al., "107-Gb/s Optical ETDM Transmitter for 100G Ethernet Transport," published in the Proceedings of the 2005 European Conference on Optical Communication (ECOC), vol. 6, Paper Th4.1.1, (2 pages).

Masahiro Daitoku et al., "100Gbit/s DQPSK Transmission Experiment without OTDM for 100G Ethernet Transport," published in the proceedings of the 2006 Optical Fiber Communication (OFC) Conference, PDP36, (3 pages).

R.A. Griffin et al., "Optical Differential Quadrature Phase-Shift Key (oDQPSK) for High Capacity Optical Transmission," published in the Proceedings of the 2002 OFC Conference, pp. 367-368.

K. Higuma et al., "X-Cut Lithium Niobate Optical Single-Sideband Modulator," published in Electron. Letters, 2001, vol. 37, No. 8, pp. 515-516.

* cited by examiner

*Primary Examiner* — Nathan Curs
(74) *Attorney, Agent, or Firm* — Mendelsohn, Drucker & Dunleavy, P.C.

(57) ABSTRACT

An optical transmitter that uses half-rate electrical signals, without multiplexing them to the full rate, to generate a full-rate optical duobinary signal. In one embodiment, an optical transmitter of the invention has a Mach-Zehnder modulator (MZM) driven by two half-rate electrical data streams. A first half-rate data stream is applied to drive a first arm of the MZM. A delay element misaligns a second half-rate data stream that is synchronized with the first data stream by one half of a bit period, and the resulting misaligned data stream is applied to drive a second arm of the MZM. The MZM is configured to (i) transmit substantially no light from the feeding laser when the applied data streams have the same binary value and (ii) have a maximum transmission when the applied data streams have different binary values, thereby generating a full-rate optical duobinary signal at its output.

24 Claims, 5 Drawing Sheets

GENERATION OF A FULL-RATE OPTICAL DUOBINARY SIGNAL USING HALF-RATE ELECTRICAL BINARY SIGNALS

BACKGROUND OF THE INVENTION

1. Field of the Invention

The present invention relates to optical communication equipment and, more specifically, to equipment for generating optical duobinary signals.

2. Description of the Related Art

Duobinary signaling was introduced in the 1960s and since then has found numerous applications in communication systems. The principle of duobinary signaling is explained, for example, in an article by A. Lender that appeared in IEEE Transactions on Communications and Electronics, vol. 82 (May, 1963), pp. 214-218. Briefly, duobinary signaling uses three signal levels, for example, "+1", "0", and "−1". A signal corresponding to one of these levels (i.e., a duobinary symbol) is transmitted during each signaling interval (duobinary bit period). A duobinary signal is typically generated from a corresponding binary signal using certain transformation rules, according to which direct transitions between the "+1" and "−1" levels are forbidden. Although both the binary signal and the corresponding duobinary signal carry the same information, the bandwidth of the duobinary signal may be reduced by a factor of 2 compared to that of the binary signal.

In optical communication systems, duobinary encoding is typically implemented using phase modulation of a carrier optical beam as disclosed in U.S. Pat. No. 5,867,534, which is incorporated herein by reference in its entirety. More specifically, for the "0" bit, substantially no light is transmitted. However, the "+1" and "−1" bits are transmitted as light having +E and −E electric fields, respectively, where the opposite polarities of the electric field represent a relative phase shift of 180 degrees.

A typical prior-art optical duobinary transmitter employs a Mach-Zehnder modulator (MZM) driven by a corresponding full-rate electrical signal. For example, a prior-art optical duobinary transmitter configured to generate a 100-Gb/s optical duobinary signal is driven by a 100-Gb/s electrical signal. However, with the currently available technology, electronic components adapted to operate at 100 Gb/s, such as electrical multiplexers and amplifiers for MZM drivers, are difficult and/or expensive to make. In addition, losses in coaxial cables and connectors tend to increase with increasing bit rates.

SUMMARY OF THE INVENTION

Problems in the prior art are addressed by various embodiments of an optical transmitter that uses half-rate electrical signals, without multiplexing them to the full rate, to generate a full-rate optical duobinary signal. Advantageously over prior-art transmitters, transmitters of the invention do not have the complexity and/or cost associated with the use of full-rate electrical signal multiplexers.

In one embodiment, an optical transmitter of the invention has a Mach-Zehnder modulator (MZM) driven by two half-rate electrical data streams. A first half-rate data stream is applied to drive a first arm of the MZM. A delay element misaligns a second half-rate data stream that is synchronized with the first data stream by one half of a bit period, and the resulting misaligned data stream is applied to drive a second arm of the MZM. The MZM is configured to (i) transmit substantially no light from the feeding laser when the applied data streams have the same binary value and (ii) have a maximum transmission when the applied data streams have different binary values, thereby generating a full-rate optical duobinary signal at its output.

According to one embodiment, the present invention is a method of generating an optical duobinary signal comprising: (A) applying a first data stream having a first bit rate to drive a first arm of an optical modulator; (B) misaligning a second data stream with respect to the first data stream by one half of a bit period corresponding to the first bit rate, wherein the second data stream is synchronized with the first data stream and has the first bit rate; and (C) applying said misaligned data stream to drive a second arm of the optical modulator, wherein the optical modulator is adapted to modulate an optical beam based on said applied data streams to generate the optical duobinary signal.

According to another embodiment, the present invention is an optical transmitter comprising: (A) an optical modulator adapted to modulate an optical beam to generate an optical duobinary signal; and (B) a delay element, wherein: a first arm of the optical modulator is adapted to be driven by a first data stream having a first bit rate; the delay element is adapted to misalign a second data stream synchronized with the first data stream and having the first bit rate with respect to the first data stream by one half of a bit period corresponding to the first bit rate; and a second arm of the optical modulator is adapted to be driven by said misaligned data stream.

According to yet another embodiment, the present invention is an optical transmitter comprising: (A) means for modulating an optical beam to generate an optical duobinary signal; means for applying a first data stream having a first bit rate to drive a first arm of said means for modulating; (B) means for misaligning a second data stream with respect to the first data stream by one half of a bit period corresponding to the first bit rate, wherein the second data stream is synchronized with the first data stream and has the first bit rate; and (C) means for applying said misaligned data stream to drive a second arm of said means for modulating.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1:
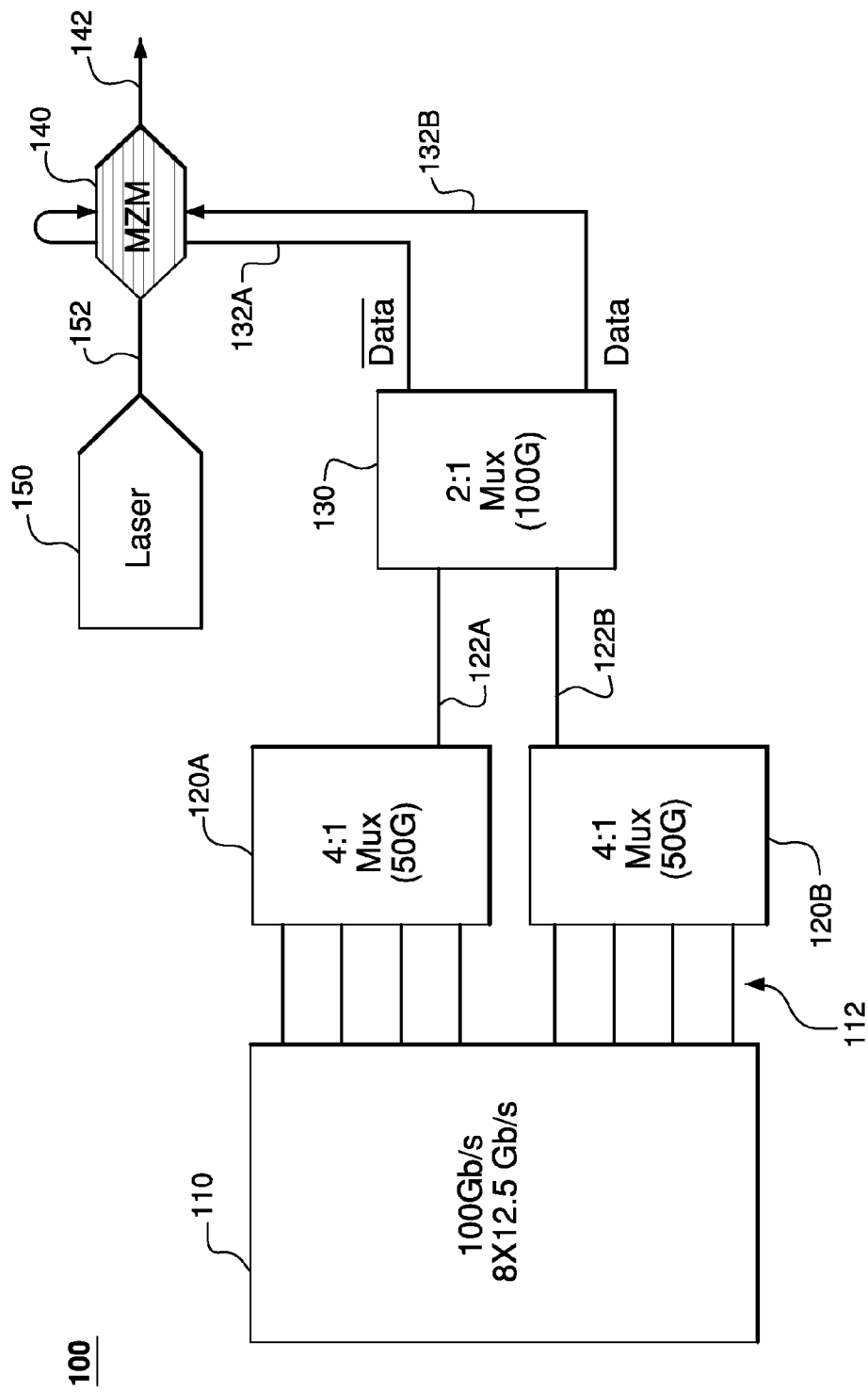
FIG. 1 shows a block diagram of a prior-art optical duobinary transmitter.

FIG. 1 shows a block diagram of a prior-art optical duobinary transmitter 100. Block 110 of transmitter 100 represents a generalized data source that outputs eight data streams (electrical binary signals) 112, each having a bit rate of 12.5 Gb/s. In various embodiments of transmitter 100, each of data streams 112 can originate from a variety of data sources, either internal or external to the transmitter. Block 110 can also perform duobinary precoding, e.g. using a known XOR/ one-bit-delay-feedback scheme, which acts to curtail error propagation in a duobinary output signal 142 generated by transmitter 100.

Data streams 112 are grouped into two groups of four, and each group is applied to a respective 4:1 multiplexer (MUX) 120, where the four respective 12.5-Gb/s data streams are multiplexed to produce a respective multiplexed data stream 122 having a bit rate of 50 Gb/s. Data streams 122 are then applied to a 2:1 MUX 130, where they are further multiplexed to produce data streams 132A-B, each having a bit rate of 100 Gb/s. Note that bit stream 132A is an inverted copy of bit stream 132B. Data streams 132A-B are then used to drive a Mach-Zehnder modulator (MZM) 140 in a push-pull configuration.

MZM 140 has a 3-dB bandwidth of about 30 GHz and therefore, in addition to modulating a CW beam 152 generated by a laser 150, acts as a low-pass filter. As explained in more detail in an article by H. Kim, et al., entitled "On the Use of 2.5-Gb/s Mach-Zehnder Modulators to Generate 10-Gb/s Optical Duobinary Signals," published in IEEE Photonics Technology Letters, 2004, vol. 16, p. 2577, the teachings of which are incorporated herein by reference, low-pass filtering characteristics of an MZM enable direct use of electrical binary nonreturn-to-zero (NRZ) signals, without electrical binary-to-duobinary conversion, for driving the MZM to generate optical duobinary signals. Accordingly, in transmitter 100, electrical binary signals 132A-B are used directly, without electrical binary-to-duobinary conversion, to drive MZM 140, which generates an optical duobinary output, i.e., signal 142, corresponding to those electrical binary signals. Further description of transmitter 100 can be found, e.g., in an article by P. Winzer, et al., entitled "107-Gb/s Optical ETDM Transmitter for 100 G Ethernet Transport," published in the Proceedings of the 2005 European Conference on Optical Communication (ECOC), at Th4.1.1, the teachings of which article are incorporated herein by reference.

Note that, in transmitter 100, optical duobinary signal 142 has a bit rate of 100 Gb/s, and MZM 140 is driven using 100-Gb/s (i.e., full-rate) electrical binary signals 132. As clear from the above description, the use of full-rate MUX, i.e. MUX 130, in transmitter 100 is necessary to generate signals 132. Disadvantageously, the presence of MUX 130 causes transmitter 100 to be relatively complex and/or expensive.

Figure 2:
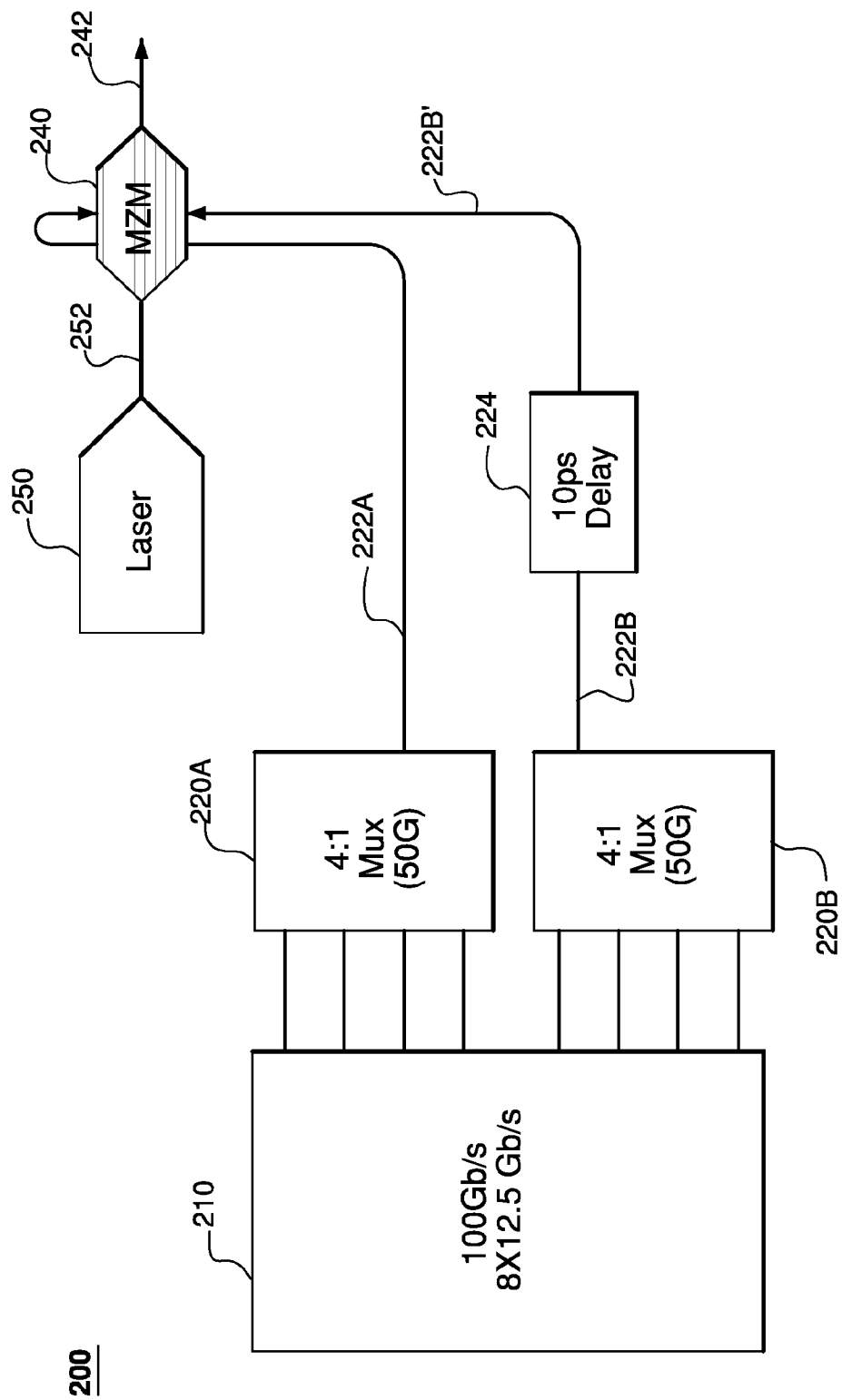
FIG. 2 shows a block diagram of an optical duobinary transmitter according to one embodiment of the invention.

FIG. 2 shows a block diagram of an optical duobinary transmitter 200 according to one embodiment of the invention. For illustration purposes, transmitter 200 is described below in reference to an embodiment, in which an optical duobinary output signal 242 generated by the transmitter has a bit rate of 100 Gb/s. One skilled in the art will appreciate that, in other embodiments, transmitters 200 can similarly be used to generate optical duobinary output signals having bit rates other than 100 Gb/s.

Block 210 and MUXes 220A-B of transmitter 200 are generally analogous to block 110 and MUXes 120A-B, respectively, of transmitter 100 (see FIG. 1). Consequently, multiplexed data streams (electrical binary signals) 222A-B generated by MUXes 220A-B, respectively, have a bit rate of 50 Gb/s. Note that data streams 222A-B are synchronized to one another, i.e., are referenced to the same clock signal (not shown) and have time-aligned transition edges. One difference between transmitters 100 and 200 is however that, in the latter, the 50-Gb/s (half-rate) data streams are not multiplexed to produce a 100-Gb/s (full-rate) electrical multiplexed signal. As a result, transmitter 200 does not need and does not have a full-rate MUX analogous to MUX 130 of transmitter 100. Yet, as further explained below, transmitter 200 is capable of generating 100-Gb/s (full-rate) optical duobinary output signal 242 using, without multiplexing, 50-Gb/s (half-rate) electrical signals 222A-B. Advantageously over prior-art transmitter 100, transmitter 200 does not have the complexity and/or cost associated with the use of a full-rate signal multiplexer.

Optical duobinary output signal 242 is generated in transmitter 200 using an MZM 240 and a laser 250 that are generally analogous to MZM 140 and laser 150, respectively, of transmitter 100. Signal 222A is applied directly to MZM 240 to drive its one arm, while signal 222B is applied to drive the other arm of the MZM after being delayed with respect to signal 222A by 10 ps in a delay element 224. Note that the 10-ps delay introduced by delay element 224 represents one half of a bit period for signals 222A-B or, equivalently, a full bit period for signal 242. In FIG. 2, delayed signal 222B is labeled 222B'.

Using the application of appropriate drive voltages to the modulator arms, MZM 240 is configured to (i) transmit substantially no light from laser 250 when signals 222A and 222B' have the same binary value and (ii) have a maximum transmission when signals 222A and 222B' have different binary values. In the latter case, the phase of transmitted light depends on whether signal 222A or signal 222B' has a "zero." More specifically, the phase difference between the two MZM states in which one of signals 222A-B has a "zero" while the other has a "one" is 180 degrees. This configuration of MZM 240 can be summarized by Eq. (1) as follows:

| $S_{222A}$ | $S_{222B}$ | $S_{242}$ | (1) |
|---|---|---|---|
| 0 | 0 | 0 | |
| 0 | 1 | $+E$ | |
| 1 | 0 | $-E$ | |
| 1 | 1 | 0 | | where $S_{222A}$, $S_{222B}$, and $S_{242}$ denote signals 222A, 222B', and 242, respectively, and E denotes the electric field of signal 242. As already indicated in the background section, opposite polarities of electric field E represent a relative phase shift of 180 degrees. Unlike MZM 140 of FIG. 1, MZM 240 does not perform low-pass filtering. MZM 240 can achieve this function by modifying either the phase or the amplitude or a combination of phase and amplitude of the light in each arm. For example, an MZM with a fixed 180 degree phase shift between the arms and an amplitude only modulator, such as an electro absorption modulator, in each arm can achieve the required functionality and be used in various embodiments of the invention.

Figure 3:
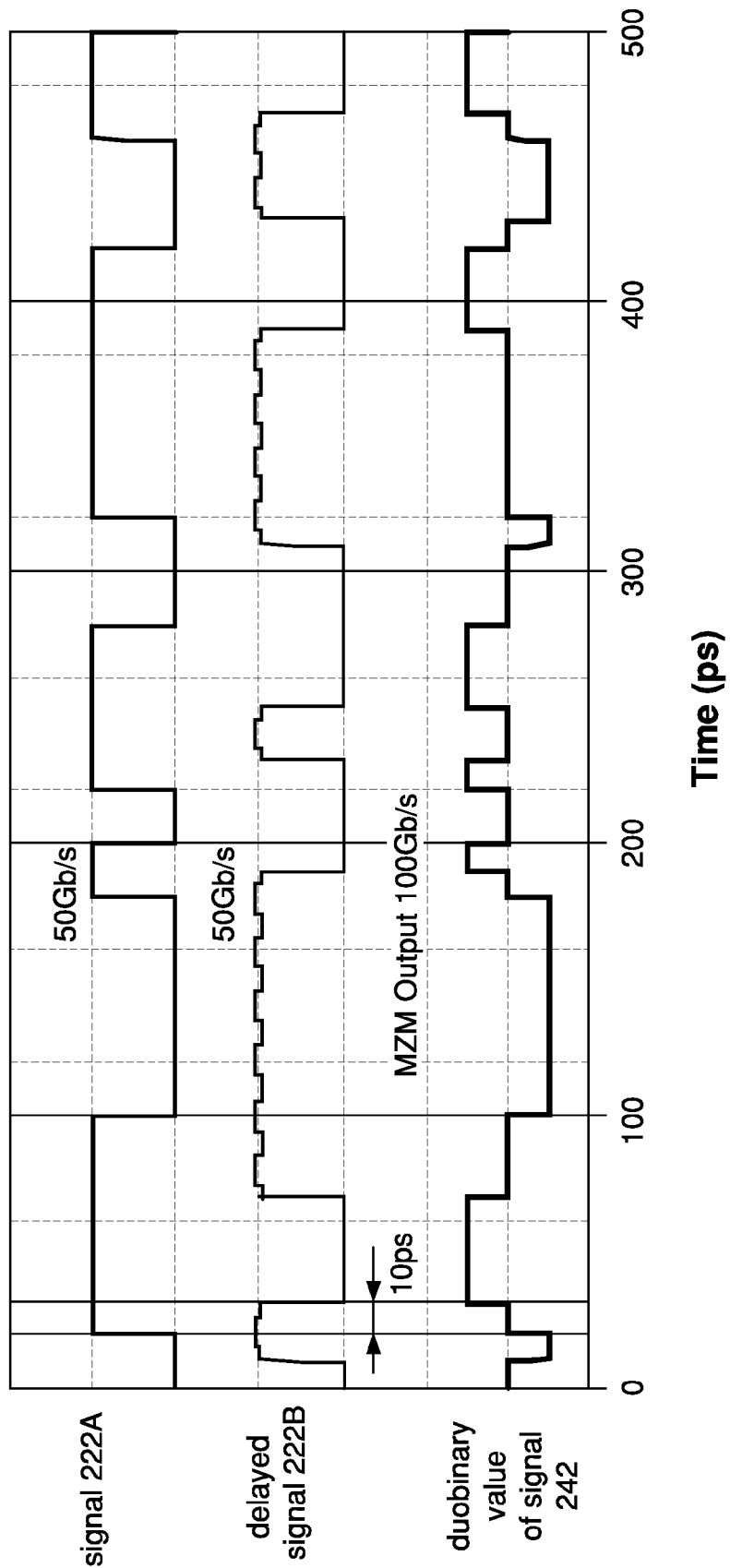
FIG. 3 graphically illustrates the operation of the transmitter shown in FIG. 2.

FIG. 3 graphically illustrates the operation of transmitter 200. More specifically, the top trace in FIG. 3 shows a representative portion of signal 222A; the middle trace shows a representative portion of signal 222B'; and the bottom trace represents a stream of duobinary values that is encoded onto signal 242 by MZM 240 driven using the signal portions shown by the top and middle traces. Since signal 222A has a bit period of 20 ps, it can have state transitions (pulse edges) at times t=k×20 ps, where k is an integer. Similarly, signal 222B' can have state transitions at times t=10+k×20 ps, where the additional 10 ps represent the delay introduced by element 224. Note that state transitions of (half-rate) signals 222A and 222B' are misaligned by one half of a bit period corresponding to the (common) bit rate of these half-rate signals. When combined, the transition times of signals 222A and 222B' form a time grid having times t=m×10 ps, where m is an integer. Since signal 242 can have a state transition whenever one of signals 222A and 222B' has a transition, signal 242 has a bit period of 10 ps and thus is a 100-Gb/s signal. Visual inspection of the traces shown in FIG. 3 confirms this conclusion.

Mathematical verification of the duobinary signal-generation scheme implemented in transmitter 200 can be obtained as follows. Let us consider two full-rate bit sequences $S_0$ and $S_1$ given by Eqs. (2) and (3):

$$S_0 = a_1, a_1, a_2, a_2, a_3, a_3 \ldots a_N, a_N \quad (2)$$

$$S_1 = b_1, b_1, b_2, b_2, b_3, b_3 \ldots b_N, b_N \quad (3)$$

where each of $a_i$ and $b_i$ is a binary symbol that can be either "0" or "1.". Note that each symbol $a_i$ and $b_i$ in sequences $S_0$ and $S_1$, respectively, is repeated two times, which effectively makes each of these sequences a half-rate sequence. Let us now append an arbitrary bit x at the beginning of sequence $S_1$ and an arbitrary bit y at the end of sequence $S_0$. The resulting two sequences, $S_1'$ and $S_0'$, are given by Eqs. (4) and (5) as follows:

$$S_1' = x, b_1, b_1, b_2, b_2, b_3, b_3 \ldots b_N, b_N \quad (4)$$

$$S_0' = a_1, a_1, a_2, a_2, a_3, a_3 \ldots a_N, a_N, y \quad (5)$$

Let us now define an "add" operator according to Eq. (6):

| $s_0$ | $s_1$ | $s_0 + s_1$ | |
|---|---|---|---|
| 0 | 0 | 0 | (6) |
| 0 | 1 | 1 | |
| 1 | 0 | −1 | |
| 1 | 1 | 0 | | where $s_0$ and $s_1$ designate any two contemporaneous binary symbols of sequences $S_0'$ and $S_1'$, respectively. By applying this add operator to sequences $S_0'$ and $S_1'$, one obtains the following "sum" sequence:

$$S_0' + S_1' = a_1 + x, a_1 + b_1, a_2 + b_1, a_2 + b_2, a_3 + b_2, a_3 + b_3 \ldots a_N + b_{N-1}, a_N + b_N, y + b_N \quad (7)$$

where each "+" represents an instance of the add operator. Note that the sum sequence of Eq. (7) is a ternary sequence because, according to Eq. (6), each symbol in the sum sequence can adopt one of three values, "−1," "0," and "1." Further note that, because any two neighboring symbols in the sum sequence always have a common element (i.e., either $a_i$ or $b_i$) in their respective sums, the sum sequence has no transitions between the "−1" and "1" levels. For the same reasons, the sum sequence does have transitions between the "−1" and "0" levels and the "0" and "1" levels. It follows then that the sum sequence of Eq. (7) is a full-rate duobinary sequence.

By comparing Eqs. (1) and (6), one first notes that they are substantially equivalent. As such, the above-defined add operator gives a mathematical representation of the electrical-to-optical (E/O) signal conversion performed by MZM 240. Furthermore, by noticing that Eqs. (4) and (5) give mathematical representations of signals 222B' and 222A, respectively, one concludes that Eq. (7) gives a mathematical representation of signal 242. It therefore follows that signal 242 is a true full-rate duobinary signal.

Figure 4:
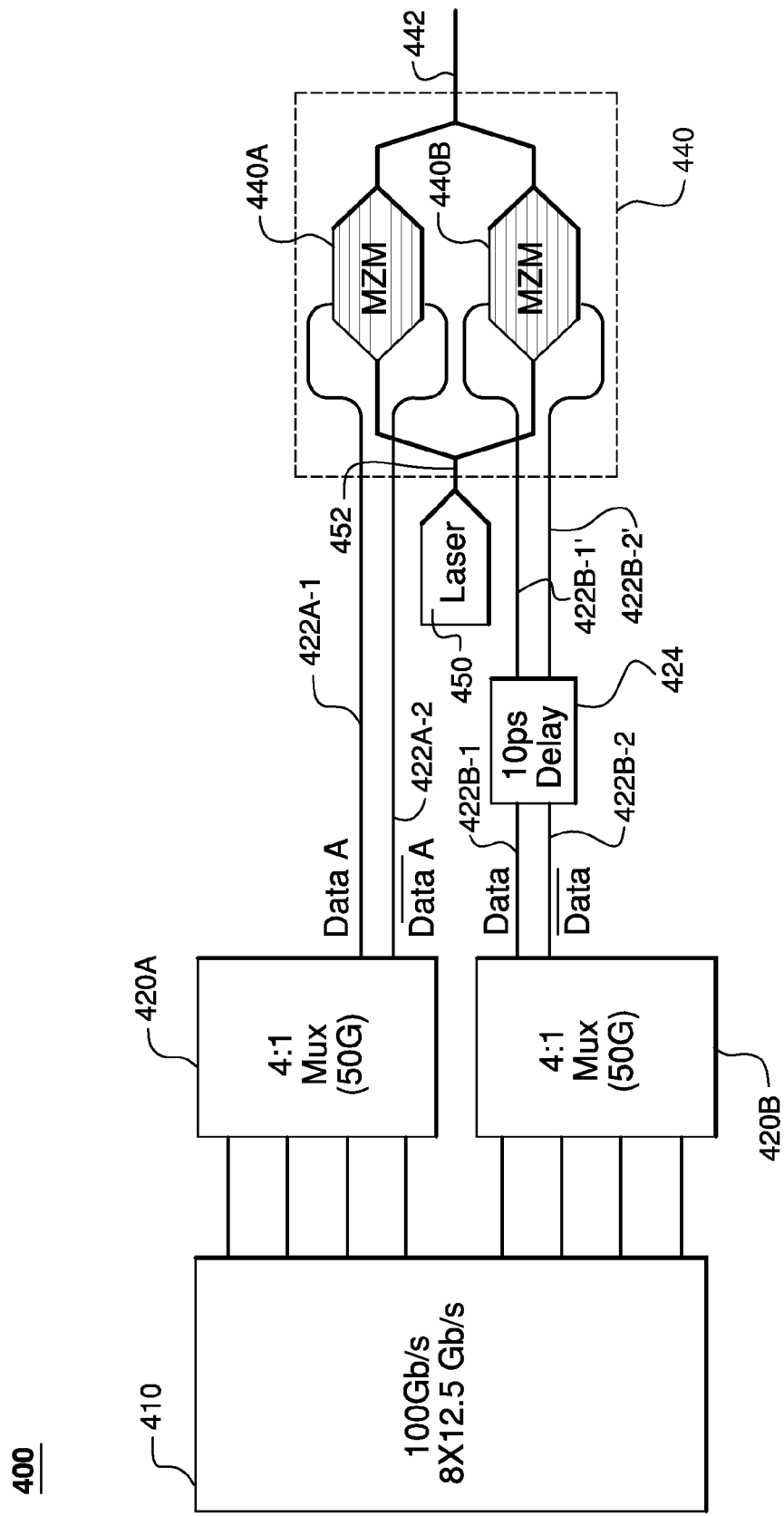
FIG. 4 shows a block diagram of an optical duobinary transmitter according to another embodiment of the invention.

FIG. 4 shows a block diagram of an optical duobinary transmitter 400 according to another embodiment of the invention. Transmitter 400 has a block 410 and MUXes 420A-B that are generally analogous to block 210 and MUXes 220A-B, respectively, of transmitter 200 (see FIG. 2), except that each of MUXes 420A-B is designed to multiplex its tributaries to generate two mutually inverted data streams. More specifically, MUX 420A generates a 50-Gb/s data stream 422A-1 and its inverted copy, i.e., signal 422A-2. Similarly, MUX 420B generates a 50-Gb/s data stream 422B-1 and its inverted copy, i.e., signal 422B-2. Signals 422B-1 and 422B-2 are delayed with respect to signals 422A-1 and 422A-2 in a delay element 424 that is generally analogous to delay element 224 of transmitter 200. In FIG. 4, delayed signals 422B-1 and 422B-2 are labeled 422B-1' and 422B-2', respectively.

Signals 422A-1, 422A-2, 422B-1', and 422B-2' are applied to a nested MZM 440. MZM 440 is termed a "nested" MZM because each of its two arms itself incorporates an MZM. More specifically, in reference to the diagram shown in FIG. 4, the upper arm of nested MZM 440 incorporates an MZM 440A, and the lower arm of the nested MZM incorporates an MZM 440B, where each of MZMs 440A-B is generally analogous to MZM 240 of FIG. 2. Signals 422A-1 and 422A-2 are applied to drive MZM 440A, while signals 422B-1' and 422B-2' are applied to drive MZM 440B. A representative example of a nested MZM that can be used as MZM 440 is described in an article by M. Daikoku et al., entitled "100 Gbit/s DQPSK Transmission Experiment without OTDM for 100 G Ethernet Transport," published in the proceedings of the 2006 Optical Fiber Communication (OFC) Conference at PDP36, the teachings of which article are incorporated herein by reference.

Nested MZM 440 is configured to transmit substantially no light from a laser 450 when each of signals 422A-1, 422A-2, 422B-1', and 422B-2' is a zero, and the electrical field $E_{OUT}$ of an optical output signal 442 generated by the nested MZM is described by Eq. (8):

$$E_{OUT} = \frac{E_{IN}}{4}((\exp(i\pi A(t)) + \exp(i\pi \overline{A}(t))) - (\exp(i\pi B(t+\tau)) + \exp(i\pi \overline{B}(t+\tau)))) \quad (8)$$

where $E_{IN}$ is the electrical field of a signal 452 generated by laser 450; A(t) and B(t) are signals 422A-1 and 422B-1, respectively; and τ is the delay introduced by delay element 424. Taking into account that $A(t) = -\overline{A}(t)$ and $B(t) = -\overline{B}(t)$, Eq. (8) simplifies into Eq. (9):

$$E_{OUT} = \frac{E_{IN}}{2}(\cos(\pi A(t)) - \cos(\pi B(t+\tau))) \quad (9)$$

Since each of A(t) and B(t) can be a "0" or a "1," Eq. (9) further simplifies into Eq. (10):

$$E_{OUT} = \frac{E_{IN}}{2}(\pm 1 \pm 1) \quad (10)$$

which means that, in each bit period, $E_{OUT}$ can have one of the following values: $+E_{IN}$, 0, and $-E_{IN}$. Since A(t) and B(t) are offset by τ (=10 ps), only one of them can change during a full-rate bit period. As such, the same analysis performed above with respect to signal 242 also applies to signal 442, thus verifying that the latter is a true full-rate duobinary signal.

Figure 5:
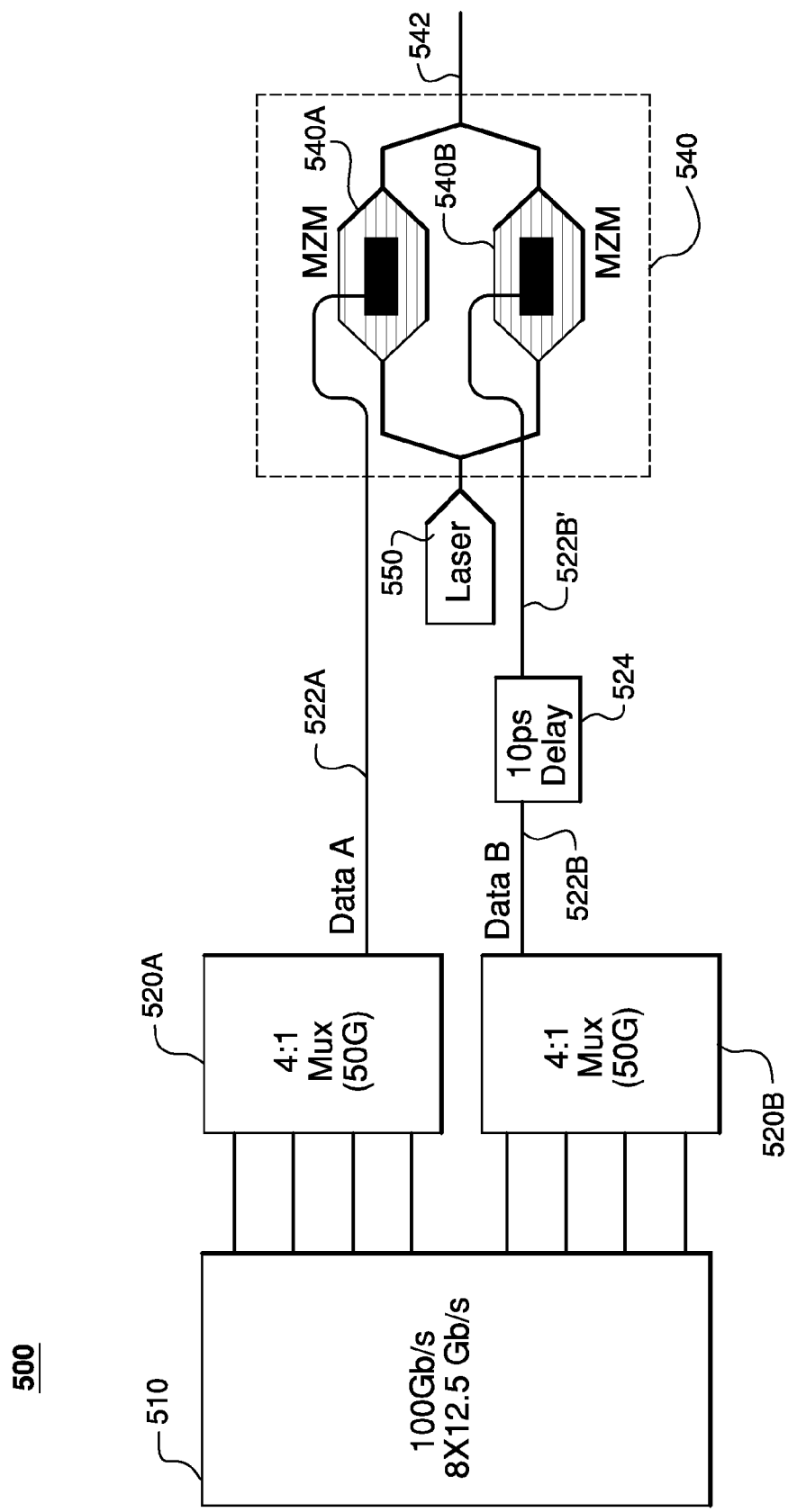
FIG. 5 shows a block diagram of an optical duobinary transmitter according to yet another embodiment of the invention.

FIG. 5 shows a block diagram of an optical duobinary transmitter 500 according to yet another embodiment of the invention. Transmitter 500 is generally analogous to transmitter 400 of FIG. 4, and analogous elements of the two transmitters are designated with labels having the same respective second and third digits. However, one difference between transmitters 400 and 500 is that the latter uses a different type of nested MZM. More specifically, nested MZM 540 is a single-ended-drive nested MZM, each arm of which can be driven with just one signal copy and does not use an additional inverted copy. This property of nested MZM 540 arises out the fact that each of MZMs 540A-B located in its arms can be differentially driven by a single electrical signal, i.e., one of signals 522A-B, respectively. The effect of that single drive signal in each of MZMs 540A-B is substantially the same as that of two differential drive signals in each of MZMs 440A-B. As a result, optical duobinary output signal 542 is generated by MZM 540 in substantially the same manner as optical duobinary output signal 442 by MZM 440 (see Eqs. (8)-(10)). Representative examples of an MZM that can be used as MZMs 540A-B are disclosed, e.g., in (i) an article by R. Griffin and A. Carter, entitled "Optical Differential Quadrature Phase-Shift Key (oDQPSK) for High Capacity Optical Transmission,", published in the Proceedings of the 2002 OFC Conference at p. 367, and (ii) an article by K. Higuma et al., entitled "X-Cut Lithium Niobate Optical Single-Sideband Modulator," published in Electron. Letters, 2001, vol. 37, p. 515, the teachings of both of which articles are incorporated herein by reference.

While this invention has been described with reference to illustrative embodiments, this description is not intended to be construed in a limiting sense. Although embodiments of the invention have been described in reference to a relative half-rate signal delay that is one half of the bit-period duration for the half-rate signals, the invention can also be practiced using other delay values that similarly misalign transition times of the two synchronized half-rate signals with respect to one another by one half of a bit period. For example, any one of delay values $t_d$ expressed by the following formula can be introduced by delay elements 224, 424, and 524:

$$t_d = \left(n + \frac{1}{2}\right) T_0,$$

where $T_0$ is the bit-period duration of the half-rate signals, and n is zero or a positive integer. For any of these delay values $t_d$, the respective synchronized half-rate signals are misaligned with respect to one another by one half of the bit period. Embodiments of the invention can be practiced to generate duobinary signals having different bit rates using appropriate half-rate binary feed signals. Although embodiments of the invention have been described in reference to MZMs, other suitable modulators can also be used. Embodiments of the present invention can be subject to different degrees of integration, including possible implementation of each of transmitters 200, 400, and 500 on a single integrated circuit. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A method of generating an optical duobinary signal, comprising:
    applying a first data stream having a first bit rate to drive a first arm of an optical modulator;
    misaligning a second data stream with respect to the first data stream by one half of a bit period corresponding to the first bit rate to produce a misaligned data stream, wherein the second data stream is synchronized with the first data stream and has the first bit rate; and
    applying said misaligned data stream to drive a second arm of the optical modulator, wherein:
        the optical modulator is adapted to modulate an optical beam based on said applied data streams to generate the optical duobinary signal; and
        the step of misaligning comprises delaying the second data stream with respect to the first data stream by a delay time greater than a bit-period duration corresponding to the first bit rate.

2. The invention of claim 1, wherein the optical modulator is adapted to:
    block the optical beam if the applied data streams have identical binary values; and
    transmit the optical beam if the applied data streams have different binary values, wherein the phase of the transmitted beam is controlled by the different binary values being applied to the modulator arms.

3. The invention of claim 1, wherein each of the first and second data streams is a nonreturn-to-zero (NRZ) electrical signal.

4. The invention of claim 1, wherein the optical duobinary signal has a bit rate that is twice the first bit rate.

5. The invention of claim 1, wherein the step of delaying comprises:
    delaying the second data stream with respect to the first data stream by time $$t_d = \left(n + \frac{1}{2}\right) T_0,$$

where $T_0$ is the bit-period duration corresponding to the first bit rate, and n is a positive integer.

6. The invention of claim 1, further comprising:
multiplexing two or more tributary data streams to generate at least one of the first and second data streams.

7. The invention of claim 1, further comprising:
generating an inverted copy of the first data stream;
applying the inverted copy of the first data stream to drive the first arm of the optical modulator;
generating an inverted copy of said misaligned data stream; and
applying the inverted copy of said misaligned data stream to drive the second arm of the optical modulator.

8. The invention of claim 7, wherein:
the optical modulator is a nested optical Mach-Zehnder modulator, the first arm of which comprises a first optical Mach-Zehnder modulator and the second arm of which comprises a second optical Mach-Zehnder modulator;
the first data stream is applied to drive a first arm of the first optical Mach-Zehnder modulator;
the inverted copy of the first data stream is applied to drive a second arm of the first optical Mach-Zehnder modulator;
said misaligned data stream is applied to drive a first arm of the second optical Mach-Zehnder modulator; and
the inverted copy of said misaligned data stream is applied to drive a second arm of the second optical Mach-Zehnder modulator.

9. An optical transmitter, comprising:
an optical modulator adapted to modulate an optical beam to generate an optical duobinary signal; and
a delay element, wherein:
a first arm of the optical modulator is adapted to be driven by a first data stream having a first bit rate;
the delay element is adapted to misalign a second data stream, which is synchronized with the first data stream and has the first bit rate, with respect to the first data stream by one half of a bit period corresponding to the first bit rate to produce a misaligned data stream, wherein the delay element performs said misalignment by delaying the second data stream with respect to the first data stream by a delay time greater than a bit-period duration corresponding to the first bit rate; and
a second arm of the optical modulator is adapted to be driven by said misaligned data stream.

10. The invention of claim 9, further comprising:
a laser optically coupled to the optical modulator and adapted to generate the optical beam.

11. The invention o claim 9, wherein the optical modulator is adapted to:
block the optical beam if the first and misaligned data streams have identical binary values; and
transmit the optical beam if the first and misaligned data streams have different binary values, wherein the phase of the transmitted beam is controlled by the different binary values being applied to the modulator arms.

12. The invention of claim 9, wherein the optical duobinary signal has a bit rate that is twice the first bit rate.

13. The invention of claim 9, wherein the optical modulator is a Mach-Zehnder modulator (MZM) or a nested MZM.

14. The invention of claim 13, wherein the arms of said MZM or nested MZM comprise one or more amplitude modulators.

15. The invention of claim 9, wherein the delay element is adapted to delay the second data stream with respect to the first data stream by time $$t_d = \left(n + \frac{1}{2}\right)T_0,$$

where $T_0$ is the bit-period duration corresponding to the first bit rate, and n is a positive integer.

16. The invention of claim 9, further comprising:
one or more multiplexers adapted to multiplex two or more tributary data streams to generate at least one of the first and second data streams.

17. The invention of claim 9, wherein:
the first arm of the optical modulator is further driven by an inverted copy of the first data stream; and
the second arm of the optical modulator is further driven by an inverted copy of said misaligned data stream.

18. The invention of claim 17, wherein:
the optical modulator is a nested optical Mach-Zehnder modulator, the first arm of which comprises a first optical Mach-Zehnder modulator and the second arm of which comprises a second optical Mach-Zehnder modulator;
the first data stream is applied to drive a first arm of the first optical Mach-Zehnder modulator;
the inverted copy of the first data stream is applied to drive a second arm of the first optical Mach-Zehnder modulator;
said misaligned data stream is applied to drive a first arm of the second optical Mach-Zehnder modulator; and
the inverted copy of said misaligned data stream is applied to drive a second arm of the second optical Mach-Zehnder modulator.

19. The invention of claim 9, wherein the transmitter is implemented in an integrated circuit.

20. An optical transmitter, comprising:
means for modulating an optical beam to generate an optical duobinary signal;
means for applying a first data stream having a first bit rate to drive a first arm of said means for modulating;
means for misaligning a second data stream with respect to the first data stream by one half of a bit period corresponding to the first bit rate, wherein the second data stream is synchronized with the first data stream and has the first bit rate; and
means for applying said misaligned data stream to drive a second arm of said means for modulating, wherein the means for misaligning comprises a delay element adapted to delay the second data stream with respect to the first data stream by a delay time greater than a bit-period duration corresponding to the first bit rate.

21. An optical transmitter, comprising:
a nested optical Mach-Zehnder modulator (MZM) adapted to modulate an optical beam to generate an optical duobinary signal; and
a delay element, wherein:
the nested MZM comprises a first MZM, a second MZM, and a third MZM;
each of the first, second, and third MZMs comprises a first respective arm and a second respective arm connected in parallel to one another;
the first arm of the first MZM includes the second MZM; and
the second arm of the first MZM includes the third MZM; and
the second MZM is adapted to be driven by a first data stream having a first bit rate;

the delay element is adapted to misalign a second data stream with respect to the first data stream by one half of a bit period corresponding to the first bit rate to produce a misaligned data stream, wherein the second data stream is synchronized with the first data stream and has the first bit rate;

the third MZM is adapted to be driven by the misaligned data stream; and responsive to the first data stream and the misaligned data stream, the nested MZM generates the optical duobinary signal with a bit rate that is twice the first bit rate.

22. The invention of claim 21, further comprising means for generating an inverted copy of the first data stream and an inverted copy of the misaligned data stream, wherein:

the second MZM is further adapted to be driven by the inverted copy of the first data stream; and the third MZM is further adapted to be driven by the inverted copy of the misaligned data stream.

23. The invention of claim 22, wherein:

the first arm of the second MZM is driven by the first data stream;

the second arm of the second MZM is driven by the inverted copy of the first data stream;

the first arm of the third MZM is driven by the misaligned data stream; and the second arm of the third MZM is driven by the inverted copy of the misaligned data stream.

24. The invention of claim 21, wherein the delay element is adapted to delay the second data stream with respect to the first data stream by time $$t_d = \left(n + \frac{1}{2}\right)T_0$$

to produce the misaligned data stream, where $T_0$ is a bit-period duration corresponding to the first bit rate, and n is a positive integer.

* * * * *